(No Model.) 3 Sheets—Sheet 1.
C. W. HODGETTS.
MANUFACTURE OF CAR COUPLING LINKS.
No. 339,412. Patented Apr. 6, 1886.
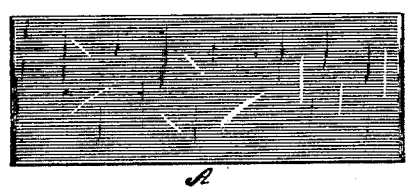
Fig. 1.a.
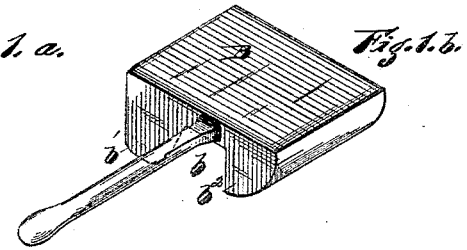
Fig. 1.b.
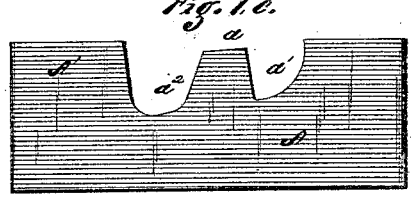
Fig. 1.c.
1st Step.
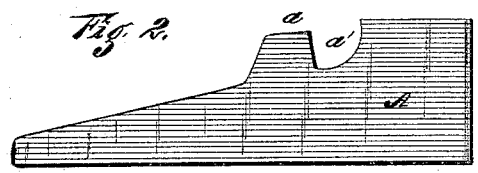
Fig. 2.
2nd Step.
3rd Step.
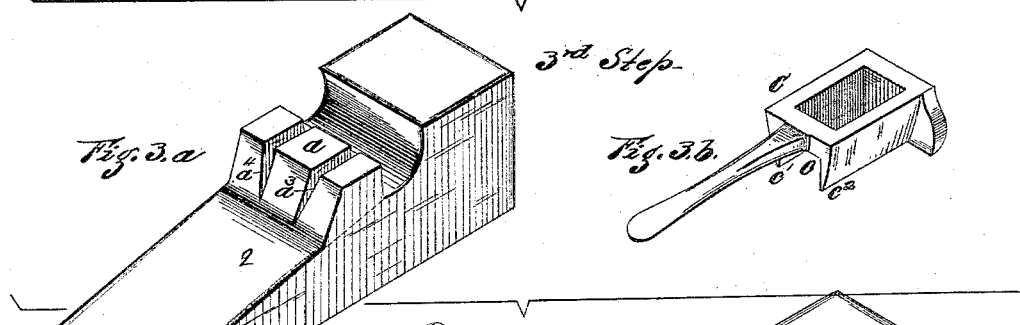
Fig. 3.a.
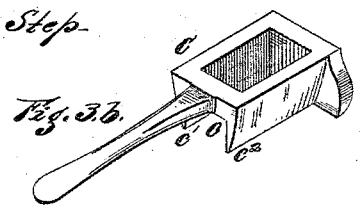
Fig. 3.b.
4th Step.
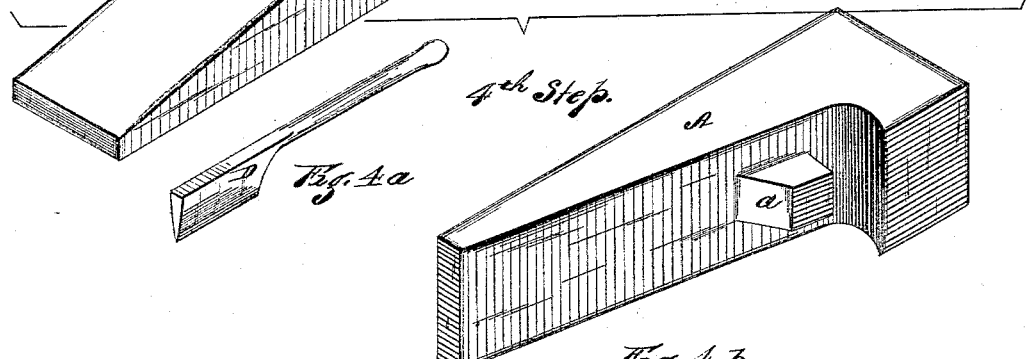
Fig. 4.a.
Fig. 4.b.
WITNESSES
Samuel E. Thomas
Th. B. O'Dogherty
INVENTOR
Christopher W. Hodgetts,
By W. W. Leggett
Attorney
N. PETERS, Photo-Lithographer, Washington, D. C.

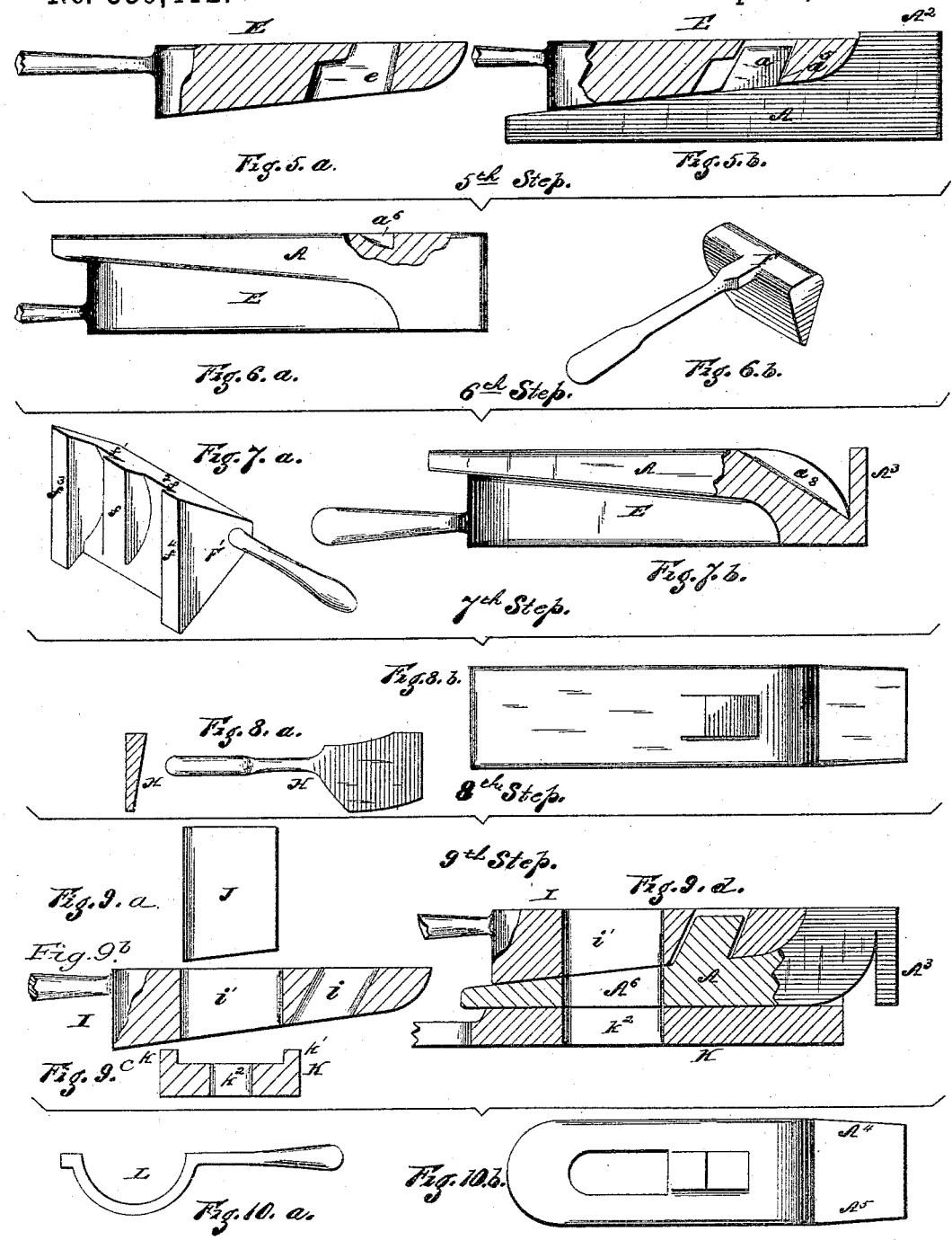

(No Model.) 3 Sheets—Sheet 3.
C. W. HODGETTS.
MANUFACTURE OF CAR COUPLING LINKS.
No. 339,412. Patented Apr. 6, 1886.
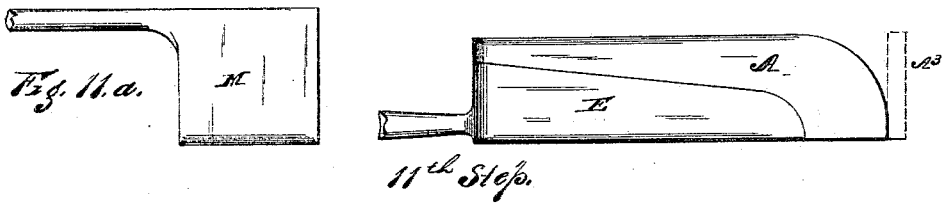
11th Step.
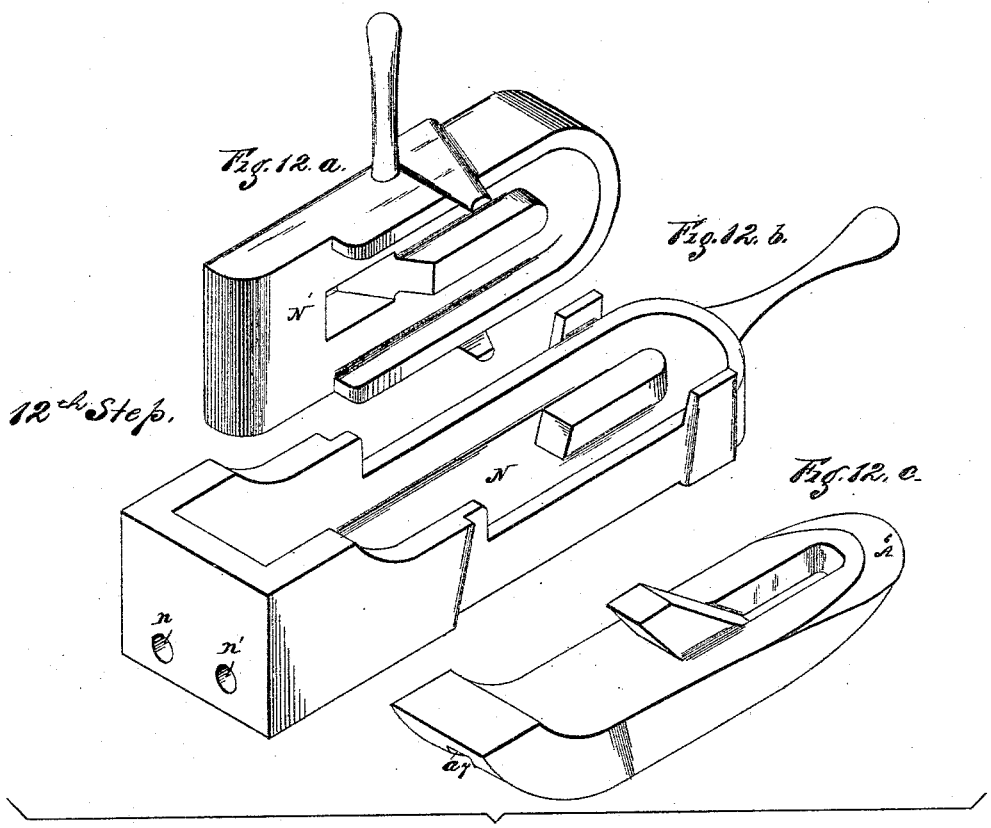
12th Step.
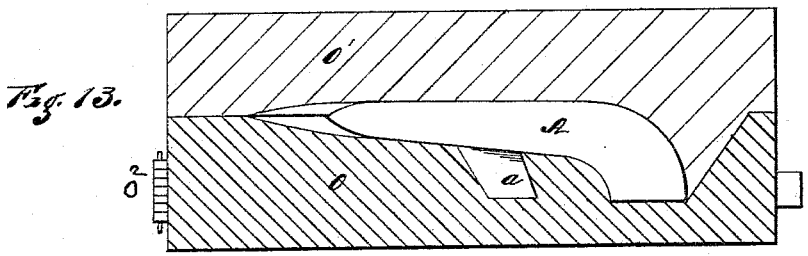
WITNESSES
Samuel E. Thomas
M. B. O'Dogherty
INVENTOR
Christopher W. Hodgetts,
By W. W. Leggett,
Attorney

UNITED STATES PATENT OFFICE.

CHRISTOPHER W. HODGETTS, OF DETROIT, MICHIGAN.

MANUFACTURE OF CAR-COUPLING LINKS.

SPECIFICATION forming part of Letters Patent No. 339,412, dated April 6, 1886.

Application filed February 8, 1886. Serial No. 191,207. (No model.)

*To all whom it may concern:*

Be it known that I, CHRISTOPHER W. HODGETTS, a subject of the Queen of Great Britain, residing at Detroit, county of Wayne, State of Michigan, have invented a new and useful Improvement in the Process and Mechanism of Manufacturing Car-Coupler Links; and I declare the following to be a full, clear, and exact description of the same, such as will enable others skilled in the art to which it pertains to make and use it, reference being had to the accompanying drawings, which form a part of this specification.

My invention relates to novel processes and mechanism for accomplishing the same for the manufacture of what is known as the "Ames Coupler-Link."

It has heretofore been found desirable to construct said links of wrought metal, and the process of forging the same has been slow and expensive.

My invention contemplates therefore improved mechanism and method whereby said links may be manufactured of wrought metal in a more expeditious and economical manner.

I carry out my invention as more particularly hereinafter described, and more fully pointed out in the claims.

In the accompanying drawings, Figures $1^a$, $1^b$, and $1^c$ illustrate the first step in the process, A representing a solid block or bar of metal. B represents a tool with which the first step in the process is accomplished, said tool being in the form shown, provided with a recess, $b$. The tool is provided with adjacent edges or dies $b'$ $b^2$. The tool being laid upon the block A under the hammer leaves the block in the shape shown in Fig. $1^c$, with the upstanding tongue $a$ and recesses $a'$ and $a^2$ upon either side of said tongue. This completes the first step.

The second step is illustrated in Fig. 2. The block A of Fig. $1^c$ is put under a hammer and the point or end A' hammered down, reducing the block A to the shape shown in Fig. 2, completing the second step.

Figs. $3^a$ and $3^b$ illustrate the third step. C represents a cutting-tool shaped as shown, with an inner recess, $c$, and cutting-edges $c'$ and $c^2$. This tool is placed upon the tongue $a$ under a hammer, leaving the block as shown in Fig. $3^a$, with the sides of the tongues cut down as shown at $a^3$ $a^4$, completing the third step.

Figs. $4^a$ and $4^b$ illustrate the fourth step, in which D represents a cutting-tool. This tool is applied to the edges of the tongue $a$, as shown in dotted lines, Fig. $3^a$, and the exterior portions of said tongue cut off, leaving the bar in the shape shown in Fig. $4^b$, the tongue $a$ being reduced to the form therein shown.

The fifth step is illustrated in Figs. $5^a$ and $5^b$, in which E represents a tool constructed with an orifice, $e$. This tool is placed over the bar A, serving to draw down the bar furthermore into shape and forming an angle upon the tongue, as shown at Fig. $5^b$, and widening the space between the tongue and the rear $A^2$ of the bar.

The sixth step is shown in Figs. $6^a$ and $6^b$. The bar A and tool E are turned over into reverse position, the tool forming a bearing for one end of the bar. F represents a cutting-tool which, placed upon the under side of the bar under the hammer, punctures the same, as shown at $a^6$. This puncture is designed simply as a starter for the next or seventh step, illustrated in Figs. $7^a$ and $7^b$, in which F' represents a tool provided with an inner knife, $f$, and cutting-edges, as shown at $f'$ $f^2$, and preferably with guide-flanges $f^3 f^4$. The inside of said tool is hollowed, as shown at Fig. $7^a$. This tool applied to the rear $A^2$ of the bar under the hammer cuts down the same, leaving an inner groove, $a^7$, (shown in Fig. $7^c$,) corresponding to the knife $f$, and representing flanges at each side of said groove, as shown at $a^8$, the knife, however, not cutting through to the base of the bar, but leaving, preferably, a guard or backing, $A^3$.

The eighth step is shown in Figs. $8^a$ and $8^b$, in which H represents any suitable tool, which is to be simply laid upon the side of the rear section, $A^2$, of the bar under the hammer, for giving to the sides a taper or rearward incline, said bar being turned over and the tool applied to each side of the base, leaving the bar in the shape shown in Fig. $8^b$, the taper being shown along $A^4$ $A^5$.

The ninth step is shown by Figs. $9^a$, $9^b$, $9^c$, and $9^d$, in which I represents a tool to be applied to the tongue side of the bar, as shown in Fig. 9$^d$, said tool provided with a perforation, $i$, to fit over the tongue of the bar, and also with a perforation, $i'$, to form a guide for a tool, J, designed under the hammer to perforate the bar A to form the link-orifice A$^6$ of Fig. 10$^b$. K represents a bed-plate upon which the bar is located while performing this operation, (shown in longitudinal section in Fig. 9$^d$ and in cross-section, Fig. 9$^e$,) said bed-plate preferably provided with flanges $k$ $k'$, to hold the bar A in place, and with an orifice, $k^2$, conforming to the orifice $i'$ of the tool I. It will be evident that when the bar is located upon the bed-plate, the tool I applied thereto, as shown in Fig 9$^d$, and the punch or cutter J inserted into the orifice $i'$ under the hammer, the link-orifice will be readily formed.

The tenth step is shown by Figs. 10$^a$ and 10$^b$, in which L represents a cutting-tool which is applied to the forward end of the bar A, cutting into a rounded form, as shown in Fig. 10$^b$, under the hammer.

The eleventh step is shown by Figs. 11$^a$ and 11$^b$, in which M represents a cutting-tool. The bar A is laid with the tongue downward upon the tool E, when the tool M is applied to the rear under the hammer, cutting off the backing A$^3$, said backing having preferably been left on to prevent the groove from running out too soon, the same acting as a backing for the tool to work against.

The twelfth step is shown by Figs. 12$^a$, 12$^b$, and 12$^c$, in which N and N' represent a couple of dies adapted to receive the bar A between them and under the hammer, to bevel the forward end of the link, as shown at A$^6$.

Instead of the twelfth step, that shown in Fig. 13 may be adopted, the one being a modification of the other, in which dies O O' receive the bar, and under pressure of the hammer bring the general mass of the bar into a finished state. The dies O O' are the same as the dies N N', so far as their inner contour is concerned, but are arranged to be differently operated. The die O is constructed in two parts hinged, as shown at O$^2$, to be opened out for the release of the link. The dies are also located in reverse position to that shown in the foregoing step. As shown in said former step, the bar can be located in the dies quicker than by the use of the dies O O'; but I contemplate either as coming within the scope of my invention. In case the die N is used, I prefer to construct it with orifices $m$ $m'$, through which the bar may be inserted to start the link when it is to be discharged. A link so constructed may be made of either wrought metal or steel. The bar of which the link is constructed may be heated at any desired interval.

It is evident that it is not indispensable in every case that the order of these steps be followed, as in some instances they might be altered in their order without departing from the principle of my invention. It is also evident that it is unnecessary to confine myself in every instance to the particular form of tools shown.

What I claim is—

1. An improved method of constructing coupling-links, consisting of subjecting a bar of metal to the different steps herein described, substantially as set forth.

2. The herein-described method of constructing coupling-links, consisting, first, of shaping a bar of metal with a tongue, $a$, and recesses $a'$ and $a^2$; next, drawing down one end of said bar, cutting away the sides of said tongue, giving to the tongue an inclination, cutting away a groove at the rear of the bar, giving an incline to the sides of the rear, puncturing the link-orifice, rounding the front of the link, and beveling its forward edges, substantially as described.

3. An improvement in the process of constructing car-coupling links by subjecting the bar of metal to the force of a die, B, under a hammer, leaving said bar with an upstanding tongue, $a$, and recesses $a'$ $a^2$, substantially as described.

4. An improvement in the construction of car-coupling links by subjecting a bar of metal to the operation of a die, B, under a hammer, leaving the bar with an upstanding tongue, $a$, and recesses $a'$ $a^2$, and drawing down by a subsequent blow of the hammer the point A', substantially as described.

5. In the construction of car-coupling links, the process of cutting away the sides of the tongue $a$, formed upon a metallic bar, substantially as and in the manner described.

6. In the construction of car-coupling links, the process of giving an incline to the tongue $a$ by the application of a die, E, under a hammer, substantially as described.

7. In the construction of car-coupling links, the process of cutting down and grooving the rear end of a bar of metal by the application of a tool, F', under a hammer, substantially as described.

8. In the construction of car-coupling links, the process of forming a link-orifice, consisting of locating the metallic bar from which the link is constructed upon a perforated bed, K, and the application to said bar of a perforated die, I, and punching out said orifice by a tool, J, substantially as described.

9. In the construction of car-coupling links, the process of rounding the forward end of the link by the application thereto of a tool, L, under a hammer, substantially as described.

10. In the construction of car-coupling links, the process of beveling the forward edge or edges of the link, consisting of locating said link in suitable dies under pressure, substantially as described.

In testimony whereof I sign this specification in the presence of two witnesses.

CHRISTOPHER W. HODGETTS.

Witnesses:
N. S. WRIGHT,
M. B. O'DOGHERTY.